April 27, 1943. N. B. WILSON 2,317,573

CENTRIFUGAL CLUTCH

Filed May 2, 1940

Inventor
N. B. Wilson
By Frederick C. Bromley
ATTY.

Patented Apr. 27, 1943

2,317,573

UNITED STATES PATENT OFFICE 2,317,573

CENTRIFUGAL CLUTCH

Norman Bruce Wilson, Toronto, Ontario, Canada

Application May 2, 1940, Serial No. 332,917

1 Claim. (Cl. 192—107)

My invention appertains generally to clutches of the type in which the engagement between the driving and driven members of the clutch is established by a centrifugal device acting to effect a friction drive.

Clutches of this type are widely employed to gradually apply the load to a prime mover or to a power transmitting agent, and also to more or less suddenly apply the load to a motivating element when a predetermined speed has been reached.

It has already been proposed to provide such a clutch with a driving member in the nature of a disc and a driven member in the form of a drum and with a centrifugal device operably associated with the driving member and composed of a series of centrifugally actuated weights circularly arranged with the driven member and supplied with interconnecting means to synchronize their radial movements. This construction of clutch is disclosed in the patent to Arthur Lowndes, Re. 18,741, Feb. 21, 1933. In this patented structure the driving member carries dogs fitted between adjacent shoes or weights and a friction lining is disposed between adjacent dogs for each shoe or weight.

The general object of the present invention is to produce an improved clutch of the centrifugal type above referred to. More particularly the invention aims to provide a more serviceable clutch that is less expensive to manufacture, and one in which the wear faces of the shoes or weights are reinforced to prolong their life.

The invention comprehends a shoe having a body cast of soft metal in which a wear plate is moldably embedded in each side thereof adjacent to the driving elements so as to act as a wear-resisting bearing surface. Each wear plate has inturned anchoring ends, and one or more spacing plates extend between the wear plates, which are fitted in the inturned ends thereof and are moldably embedded in the shoe. The spacing plates hold the wear plates in properly spaced relation during the casting operation. The shoe is die cast in a suitable mold or matrix, as will be well understood in the art. The wear plates are of a harder metal than the shoe body and provide wear-resisting faces for engaging the driving elements so as to prolong the life of the shoe and render it more efficient.

Referring to the accompanying drawing.

Figure 1:
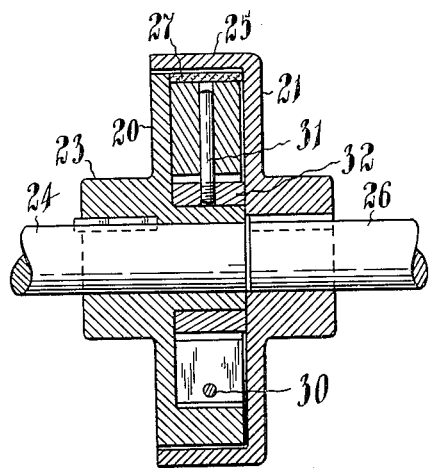
Fig. 1 is a longitudinal section of the clutch taken on line 1—1 of Fig. 2.
Figure 2:
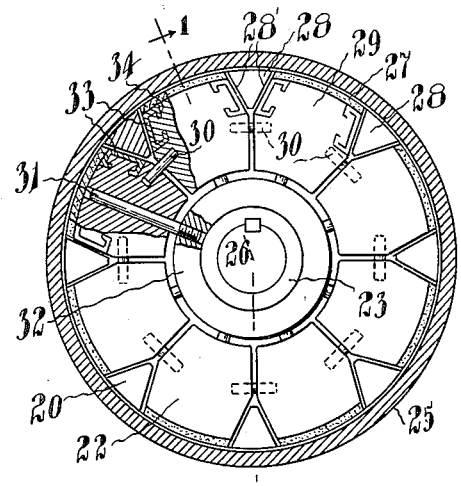
Fig. 2 is an outside face view, partly in section, of the driving member, the drum of the driven member being shown in section.
Figure 3:
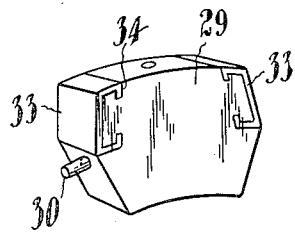
Fig. 3 is a perspective view of one of the shoes or weights of the preceding figures and illustrating more clearly the manner of fashioning the reinforcement at the upper corners that contacts the driving dogs.

In describing my improvements I have illustrated them as embodied in a clutch comprising a driving member 20, a driven member 21 and a centrifugal device 22 in the form of an annulus of centrifugally actuated shoes whose centre is concentric with the axis of rotation. As best discernible in Figs. 1 and 2, the driving member is formed as a disc and is supplied with a hub 23 keyed to a shaft 24 by which power is transmitted. The driven member 21 has an annular flange 25 sleeved over the disc of the driving member and furnished with an internal clutch face. Power is taken off the driven member by a suitable connection such as the shaft 26 on which its hub portion is secured. The complement of shoes of the centrifugal device are essentially in the form of weights that urge a friction element or elements into engagement with the internal face of the drum. It is customary to provide friction elements consisting of loose segments of brake lining, as at 27, positioned between adjacent dogs 28 on the driving member.

The shoes 29 are of the usual configuration and are interconnected as by pins 30 for synchronized radial motion, which shoes are guided in known manner by the radial rods 31 rigid with the collar 32. Ordinarily, cast metal shoes are employed in the clutch. Soft metal is used, such as lead, and the shoes are die cast. In practice it has been found that considerable wear takes place on the shoe-faces that bear against the side faces 28' of the dogs 28. Such wear is detrimental to the efficiency of the clutch and adversely affects its operation.

Figure 4:
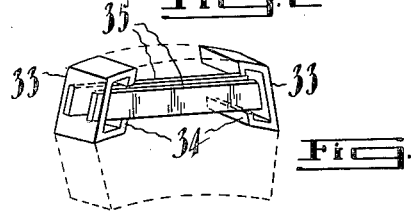
Fig. 4 depicts the mode of spacing the reinforcing pieces in the mold so as to embed them in the shoe in the die casting operation.

According to my invention I provide a wear-resisting face of relatively hard metal at each bearing area. This is accomplished by moldably embedding a plate in the shoe at each upper edge portion thereof so that the outer face of the plate lies flush. The top angular edges are thus reinforced against wear. The reinforcing plates may be C-shaped members of mild steel as denoted at 33. The inturned ends 34 of the plates serve as an anchorage. Said plates are fashioned as metal stamping and are therefore inexpensive to manufacture. In casting a shoe the plates are placed in the mold or matrix and held in spaced relation by means of spacing bars as illustrated at 35—Fig. 4. The plates extend the full width of the shoe and do not interfere with the interconnecting means 30 of adjacent shoes.

It will be manifest that by this construction the outer faces of the plates 33 contact the dogs disposed between the shoes, and that the shoes are thus reinforced against wear.

What I claim is:

A shoe for a centrifugal clutch in which shoes are arranged in series side by side and guidably controlled for radial movement by driving elements interposed between adjacent sides of the shoes, said shoe comprising a cast metal body, a wear plate moldably embedded therein at each side adjacent to the driving elements so as to act as a wear-resisting bearing surface, each plate having inturned anchoring ends, and a spacing plate extending between the wear plates and fitted in the inturned ends thereof and moldably embedded in the shoe.

N. BRUCE WILSON.